Figure 1:
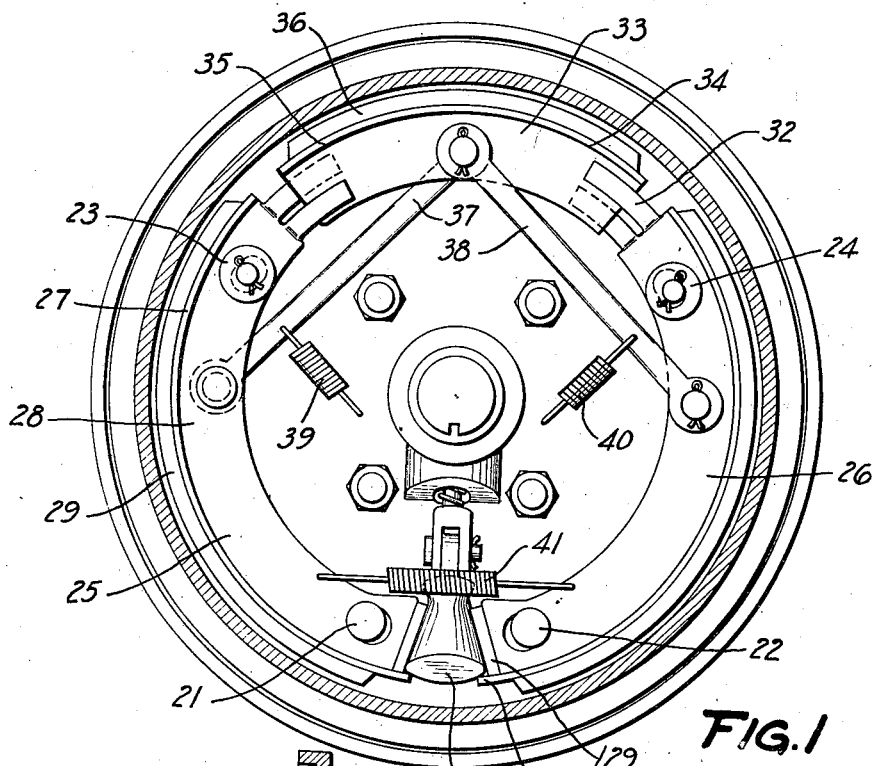

April 20, 1937.  D. F. LINSLEY  2,077,943

BRAKE

Original Filed May 21, 1930

INVENTOR.
DOUGLAS F. LINSLEY
BY
*Jn. W. McConkey*
ATTORNEY

Patented Apr. 20, 1937

2,077,943

UNITED STATES PATENT OFFICE 2,077,943

BRAKE

Douglas F. Linsley, Old Greenwich, Conn., assignor to Bendix Brake Company, South Bend, Ind., a corporation of Illinois Original application May 21, 1930, Serial No. 454,226. Divided and this application October 27, 1934, Serial No. 750,267

2 Claims. (Cl. 188—78)

This invention relates to brakes and is illustrated as embodied in an internal expanding brake for an automobile wheel.

An object of the invention is to provide a simple and effective actuating means for the friction elements of a brake, preferably supported by the pivot or king-pin of a steering head for a front wheel, wherein the applied force for actuating the friction elements of the brake may be directed in a plane substantially coinciding with the plane of application of the friction elements. In the illustrated embodiment of the invention, the means for actuating the friction elements of the brake extends axially through the pivot pin in the steering head.

A further object of the invention is to provide an actuating means of this type for a plurality of friction elements so arranged that the friction elements and the actuating means therefor may be completely housed.

Figure 2:
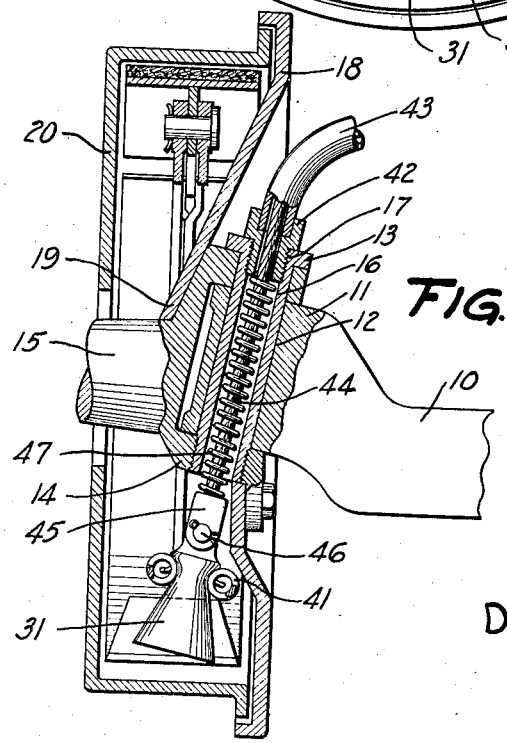

Other objects and features of the invention will appear from the following description taken in connection with the drawing, which forms a part of this specification, and in which:

Figure 1 is a side elevation of a brake embodying the invention, the drum being shown in section; and Figure 2 is a side elevation of a front axle of a motor vehicle having a steering head on which is swivelled a knuckle supporting a brake mechanism, the steering head and the brake being shown in section.

Referring to the drawing for more specific details of the invention, 10 represents the front axle of a motor vehicle having formed thereon a steering head 11. The head is bored, as indicated at 12, to receive a steering pivot pin 13 upon which is swivelled a knuckle 14 supporting a spindle 15. As shown, the pivot pin is axially bored, as at 16, and the bore is threaded at 17.

Secured on the knuckle 14 is a support such as a backing plate 18 swaged as indicated at 19, so that the bore 16 in the pivot pin 12 may open on the inner side of the backing plate. Associated with the backing plate 18 is a drum 20 which may be suitably secured to a wheel, not shown.

Positioned on the backing plate are suitable anchors 21 and 22 and steady rests 23 and 24. As shown, corresponding brake shoes 25 and 26 are positioned on the anchor 21 and steady rest 23 and anchor 22 and steady rest 24 respectively. These shoes are of a conventional type each having a rim 27, a web 28 and a suitable lining 29 secured to the rim adaptable for engagement with the radius of the drum. These shoes are interchangeable. As shown, their shouldered ends are provided with thrust plates 129 and the rims extend slightly beyond the thrust plates, as at 30, to provide an adequate seat for a cone or conical shaped actuating member 31 to be hereinafter referred to.

The other ends of the shoes are bifurcated, as indicated at 32, and the bifurcated portions are offset in opposite directions to engage the web 33 of a servo shoe 34, the rim 35 of which supports a lining 36 adapted to engage the drum. The servo shoe is pivotally connected substantially centrally between its respective ends to arms or rods 37 and 38 which are respectively pivoted to the shoes 25 and 26 preferably midway of the centers and the toes of the shoes.

Connecting the arms 37 and 38 to the backing plate are coil springs 39 and 40 and connecting the shoes 25 and 26 is a coil spring 41. These springs serve to return the shoes to the off position and to retain them when in the off position in proper spaced relation to the drum.

According to the present invention, in the brake illustrated, a nut 42 is threaded in the upper end of the pivot pin and suitably secured in a recess in this nut is a sheath 43 of an operating cable 44. The operating cable extends through the 44. pivot pin and has secured on the end thereof a clevis 45 pivoted to the cone or conical shaped actuating member 31 as by a bolt 46 and positioned on the cable intermediate the clevis and the nut is a coil spring 47 tending to force the actuating member 31 against the seat 30 on the respective friction elements. The rim of the cone-shaped member 31 is flared at its small end to provide an annular seat disposed between the pair of springs 41 when in brake released position so that they act as lateral supports and antirattle devices for said member and assist in returning and holding it in brake released position.

In operation, a pull is placed on the operating cable 44. This force compresses the spring 47 and wedges the member 31 between the thrust plates 129 on the respective shoulders of the shoes 25 and 26 causing the shoes to move apart and to engage the radius of the drum. This movement of the shoes 25 and 26 is transmitted through the rods 37 and 38 to the servo shoe 34 and this applied force, assisted by the whipping action of the drum, imparting a slight centrifugal movement of the servo shoe more effectively applies the shoes 25 and 26 by reason of their connections with the servo shoe.

Although this invention has been described in connection with certain specific embodiments, the principles involved are susceptible of numerous other applications that will readily occur to persons skilled in the art. The invention is, therefore, to be limited only by the scope of the appended claims. The present application is a division of my application No. 454,226, filed May 21, 1930.

Having thus described the various features of the invention, what I claim as new and desire to secure by Letters Patent is:

1. In a brake, friction elements having spreadable ends, a pair of springs tensioned between said ends, and a cone-shaped actuating member disposed between said ends and having its small end flared to provide an annular seat engaged on each side by one of said springs respectively in brake released position.

2. In a brake, a brake element having a web and a peripheral flange and having spreadable ends provided with thrust members, a cone-shaped actuating member between said ends and adapted to be drawn radially inwardly to apply the brake, said peripheral flange projecting beyond each thrust member to form a seat for said actuating member in the brake released position.

DOUGLAS F. LINSLEY.